Oct. 29, 1968

L. BAKKER ETAL 3,407,937

IMMISCIBLE LIQUID SEPARATOR

Filed Oct. 29, 1965

INVENTORS
**LUBERTUS BAKKER
BEVERLY S. HAZEL**

*Henry J. Kozak*
ATTORNEY

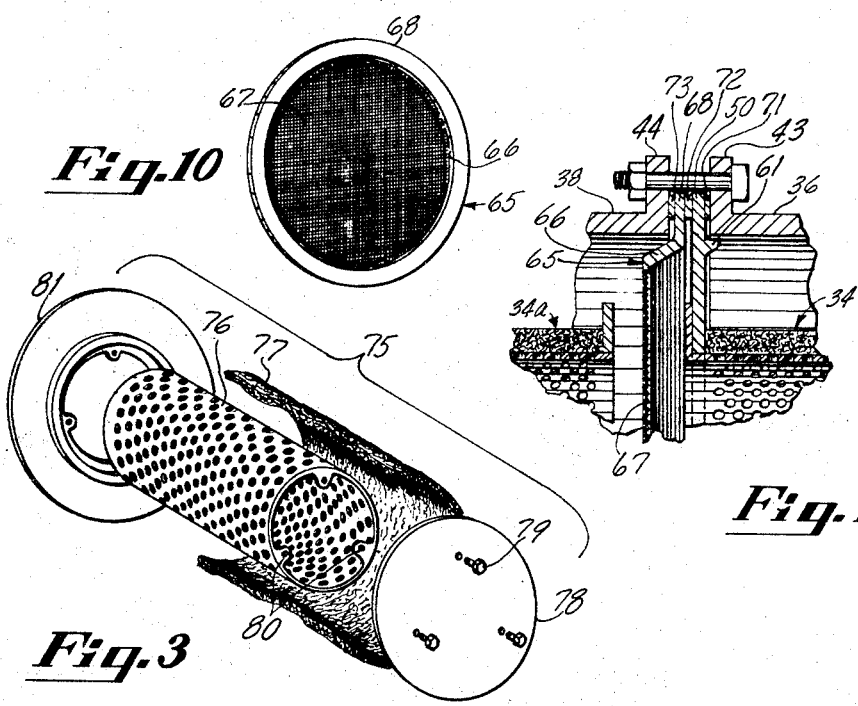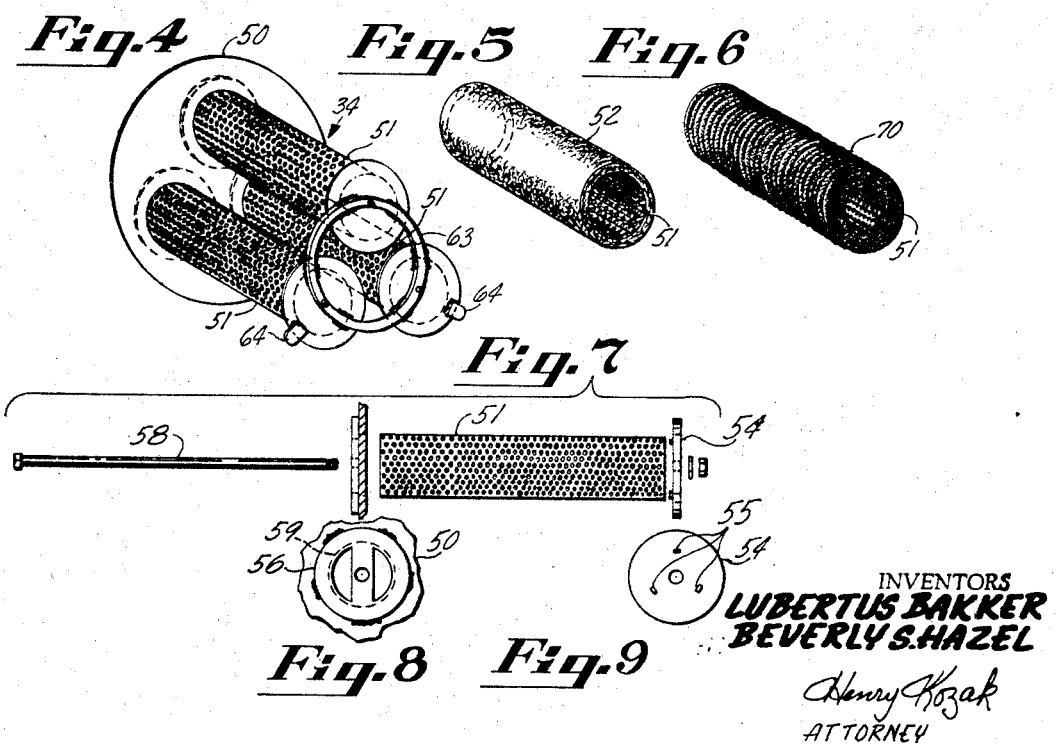

United States Patent Office 3,407,937
Patented Oct. 29, 1968

3,407,937
IMMISCIBLE LIQUID SEPARATOR
Lubertus Bakker, Cleveland Heights, and Beverly S. Hazel, Chagrin Falls, Ohio, assignors to Midland-Ross Corporation, Cleveland, Ohio, a corporation of Ohio
Filed Oct. 29, 1965, Ser. No. 505,720
4 Claims. (Cl. 210—301)

ABSTRACT OF THE DISCLOSURE

An immiscible liquid separator designed primarily for separation of suspensions comprising oily materials in water. The construction of the separator involves, in general, coalescing units disposed in series downstream relationship with screens correlated therewith in function (throughput, for instance) to effect removal of the oily matter from an essentially aqueous liquid.

---

This invention is applicable in separating the oily and aqueous components of, for example, suspensions containing mineral, vegetable, or animal oils, water-immiscible higher alcohols, chlorinated solvents, polymerizable hydrocarbons, and others.

The art of separating immiscible liquids is profuse with designs which teach a great variety of constructions and modes of operation, particularly in respect to removing impurities such as minute amounts of water from hydrocarbons, such as engine fuels. However, experience has shown that dewatering types of separators do not provide teaching for a satisfactory type of deoiling separator. Prominent in the field of deoiling are the Lawson type separators, construction and operation of which are taught, e.g., by Patent Nos. 2,651,404; 2,405,838; 3,055,505.

The present invention is motivated by the fact that the prior art yields no device which is truly satisfactory for large scale purification of aqueous carriers, although devices are known which perform under light to moderate loads but are too expensive and complicated in construction and operation to be employed where larger volumes of water containing immiscible liquid impurities must be processed. Such a problem arises, for example, in conforming to antipollution requirements in the purification of industrial plant effluents.

Hence, a principal object of this invention is to provide a separator design of simplified and inexpensive construction adaptable to the purification of aqueous effluents varying greatly in degree and type of emulsified or suspended liquid matter carried therein.

Another object is to provide an immiscible liquid separator design whereby a given piece of equipment may be easily adapted by minor physical modification of the equipment or by change in operating conditions to meet varying purification requirements, or to process liquids varying in the character of impurity.

Still another object is to more fully understand the phenomenon of separating the suspension of a liquid in another liquid immiscible therewith, particularly the purification of aqueous carriers, and to provide a more efficient method of separating such suspension from the carrying liquid.

A further object is to subject a suspension to conditions favorable for coalescing the suspended component of the suspension into progressively larger particles and to provide a method, based on such conditions or aspects of handling which are found to favor liquid separation.

The invention in its broadest aspect is based upon an efficient coalescing medium formed into a wall, and rates of movement of the suspension through a feed region, the coalescing medium or wall, and through a liquid-separating or exhaust region.

Other importantly related aspects of the invention are (1) the adjustment of viscosity of the suspended component of the suspension primarily by preheating (or cooling) the suspension, and (2) the promotion of globule size after subjecting the suspension to coalescing action by passage of the effluent of the coalescer through a screen or other open-mesh member of about 40 to 80 mesh. The term "mesh" as used herein indicates the number of openings in a screen per linear inch. In a preferred mode of practicing the invention, the viscosity of the suspended component of the suspension is adjusted, usually raised, to a desired value, e.g., some value in the range of 300 to 800 Saybolt seconds. The suspension, after temperature adjustment, is fed into apparatus comprising a housing having its length oriented in a generally horizontal direction providing a path for liquid therethorugh extending from an inlet at one end of the housing to an outlet at the other end thereof. A wall of coalescing material is supported within a portion of the housing nearer the inlet. The material is of three-dimension lattice structure defining liquid-conducting interstices therethrough and of a thickness and fineness of mesh as to cause a substantial impingement of the suspended component of the suspension, coalescence thereof, and escape in the form of larger globules. The coalescing wall has its opposite lateral surfaces parallel to the length of the housing. The coalescing wall is supported in the housing by wall means disposed between the extremities of the wall and the interior surface of the housing to partition the housing into regions at opposite sides of the coalescing wall. The interior of the housing is thus divided to define a first or feed region extending lengthwise of, and bounded partly by, the coalescing wall through which extends the portion of the path along which liquid flows from the inlet to one of the coalescing walls. At the opposite side of the wall means and the coalescing wall is a second or liquid separating region in which the liquid, after flowing through the coalescing wall, flows from the other side of the wall to the outlet.

In a preferred form of the invention, the housing, the wall, and the wall means are proportioned and arranged to establish predetermined flow-conducting capacities of the feed region, the coalescing wall, and the separating region. The fluid-conducting capacities thus established are essentially based on the areas of the feed region, the coalescing wall, and the separation region which extend in transverse relation to the above-mentioned path. These capacities establish a flow rate through the separating or exhaust region within an approximate range of 0.75 to 1.1 inches per second in the separating region when the flow rate through the coalescing wall is controlled to a rate within an approximate range of 0.08 to 0.1 inch per second. Rates of liquid travel not greater than 2 inches per second through the feed region correspond advantageously with the above named rates.

In the drawing illustrating the invention:

FIG. 1 is a schematic elevation of the apparatus of simplified design for separating immiscible liquids of a suspension.

FIG. 2 is an elevation of apparatus in perspective with foreground portions of its outer housing broken away to better illustrate interior structure for separating two immiscible liquids of which one is suspended in the other.

FIG. 3 is an exploded view in perspective of components of one type of coalescing unit that may be used in the apparatus shown in FIG. 2.

FIG. 4 is a perspective view showing in assembled condition components of a coalescing unit for supporting cylinders of coalescing medium such as shown in FIGS. 5 and 6.

FIGS. 5 and 6 are perspective views of coalescing cylinders of different construction, either of which may be mounted on the cylindrical screens shown in FIG. 4.

FIG. 7 is a longitudinally exploded longitudinal elevation of components of the assembly of FIG. 4 for supporting either single coalescing cylinder shown in FIGS. 5 and 6.

FIGS. 8 and 9 are face views of end elements of the single cylinder supporting assembly shown in FIG. 7.

FIG. 10 is a perspective view of a removable screen usually disposed at the discharge end of a coalescing cylinder.

FIG. 11 is a fragmentary section in elevation of the screen of FIG. 10 and other components of the apparatus shown in FIG. 2.

FIG. 1 illustrates schematically the invention in broad principle, depicting the liquid suspension to be treated as entering a heat exchanger 5 at an inlet 6 and feeding into the housing 7 of a coalescing apparatus 8 at its inlet 9. The heat exchanger 5 may operate either to heat or cool the liquid suspension to decrease or increase, respectively, the viscosity of the suspended liquid to the desired level most conducive to precipitation or coalescing thereof. The usual situation requires that the incoming suspension be heated until its viscosity be of some value in the range of 15 to 800 Saybolt seconds. In general, oily suspended matter is most effectively separated at some viscosity value in the middle of this range. Thus, a liquid more viscous at room temperatures than others will require heating to a higher temperature, the level of which depends upon the viscosity of such liquid as measured under standard conditions.

In general, each oily material has a different viscosity at standard conditions, and under precise practice of the invention, would require treatment in the coalescing apparatus at a temperature corresponding to the preferred viscosity at which the suspended particles thereof may be most effectively coalesced and separated from its aqueous carrier. Viscosity and temperature data respecting specific oily materials is readily available from handbooks and need not be herein presented for an understanding of the invention. In general, there are few oily materials that may be efficiently separated in accordance with this invention from a suspension having a temperature below 100° F.

Referring again to FIG. 1, the suspension, after entering apparatus 8, passes lengthwise of feed region 10 and lengthwise of one surface 12 of a wall 11 of coalescing material. In the purview of this invention, the wall 11 may be planate, cylindrical, or any other practical shape within broad principles of construction of the apparatus as will be shortly herein described.

As shown in FIG. 1, the wall 11 joins along its edges with wall means, such as partitions 14, 15, or other partition means with the interior surface of the housing 16 to separate the region 10 from a region 17 adjacent the other surface 18 of the wall. Thus, the construction arrangement is such that liquid may pass from region 10 to region 17 only through the coalescing wall 11. Considerable coalescing of the suspended liquid of the suspension takes place near the surface 12 of the coalescing wall, i.e., upon initial contact or impingement with material of three dimensional lattice construction contained in the wall 11. To provide the desired interstitial construction, the wall material has interstices extending from region 11 to region 17, such as exists in a wall of attenuated fiber, strand, or particle construction. Substantial coalescing of the suspended particles in the larger globules occurs adjacent the surface 12. Buoyancy of the globules within the carrying liquid increases with size. Globules of sufficient size and buoyancy to counteract the force of the current tending to carry them through the coalescing wall 11 rise within the region 10 and collect in an upward chamber or dome 20 of the housing as a body of liquid 21 having an interface 22 with the carrier liquid disposed below the interface.

Less buoyant or smaller globules of coalesced suspended liquid are carried by the carrier liquid into region 17. These globules are not as buoyant as those which collected in the dome 20 overlying the region 10 but they are to some degree buoyant and thus capable upon sufficient travel of such carrier liquid, to separate therefrom. They begin to arise immediately to an extent depending on buoyancy and tend to separate from the carrier liquid as they pass through a separating region 24 which includes, for purposes of separation, also the region 17.

Promotion of globule size is greatly enhanced by passing the effluent from the coalescing wall 11 through a screen 25 of such mesh that it does not break down globule size and reemulsify the initially suspended liquid. The screen 25 is shown of vertical planate orientation substantially across an entire cross section of the housing 16 but may be disposed in any manner within the housing as to cause all of the effluent from the wall 11 to pass therethrough. In practicing the present invention, screens of about 60 mesh of a variety of plastic, metal and fabric materials were effective in promoting the separation of the suspended liquid from the carrier liquid to an amazing degree. The mesh of the screen may be increased to about 80 or reduced to about 40 for measurable enhancement of liquid separation.

It is believed that the screen accomplishes separation of the suspended liquid in at least two ways. It collects the small size globules which escaped from the wall 11 into the deposit of liquid formed on the screen and discharges the liquid in the form of more buoyant larger globules. Secondly, the uncoalesced particles of original suspension passing through the coalescing wall 11 impinge upon the deposit of coalesced liquid adhering to the screen and become integralized with the deposit along with the small globules collected. In maintaining the liquid velocities herein taught, the screen 25 tends to collect and maintain a considerable deposit of the liquid adhering thereto.

The screen discharges the suspended liquid as large globules which, in an amazing fashion, take the path shown in FIGS. 1 and 2. That is to say, near the bottom of the screen, they rise nearly vertically and pass in a steep trajectory upwardly within the carrier liquid to a dome 27 wherein they collect as a body of liquid 28 having an interface 29 with the carrier liquid disposed below the interface.

Essential to the more general type of apparatus described in FIG. 1 as well as later described embodiments is that certain velocity relationships be maintained in the passage of the carrier liquid from the inlet to the outlet. That is to say, the liquid-conducing capacity of region 10, the coalescing wall 11, and the region 24 are preferably related as herein taught to obtain most effective separation of the suspended liquid from the carrier liquid. Thus, the cross sections of region 10, wall 11, and region 24 which are transverse to the path of the liquid therethrough are proportioned to establish a flow-rate through the coalescing wall in the approximate range of 0.08 to 0.1 inch per second and a flow-rate of not exceeding a preferable range of about 0.75 to 1.1 inches per second through the separating region 24 under optimum operating conditions. Such rates result in very satisfactory liquid separation, much of which is effected exteriorly of the outer or entrance side of the coalescing cylinder by proportioning the dimensions of the liquid separator to cause liquid to travel in the feed-region at a rate not greater than about 2 inches per second.

FIGS. 2 and 4 to 9 are illustrative of a deoiler type liquid separator now commercially available and in use. These figures illustrate a triple-cylinder coalescing unit used within two of the three housing sections which constitute the outer shell or housing 35. To facilitate identity, the three sections of the housing are denominated as an intake section 36 having an inlet duct 37 for the apparatus, an intermediate section 38, and an exhaust section 39 having an outlet duct 41 through which purified effluent is discharged from the apparatus.

Adjacent housing sections have adjacent mating flanges, e.g., flanges 43 and 44 of sections 36 and 38, respectively, by which adjacent sections may be connected in end-to-end relationship by bolts 45. In a like manner, section 38 is connected to section 39 by flanges 46 and 47. Flanges 44 and 46 are of identical but opposite facing construction in order that more than one intermediate housing section, similar to section 38 may be employed if required to attain a desired degree of purification usually measured in parts per million (p.p.m.) of the suspended liquid remaining in the carrier liquid. For this reason, the intermediate sections are preferably made of identical length so that the coalescing units (see unit 34), may be built to an identical length shorter than the length of the intermediate sections. Hence, for simpliciy of design, the intake housing section is constructed of a length which exceeds and amply accommodates the standard length adopted for the coalescing unit.

The coalescing unit 34 comprises a disc or plate-like flange member 50 of a circular periphery which functions (1) to support other portions of the coalescing unit, namely, three screen-like foraminous supports 51 of cylindrical shape, (2) a coalescing cylinder 52 fitting around and supported by each support 51, (3) an end plate 54 for each support provided with positioning lugs 55 fitting the internal periphery of the support 51, (4) an end plate 56 secured fixedly to the face of the flange member 50 which faces toward the outlet of the apparatus, and (5) a bolt 58 extending through the flange member 50, the support, and the end plates for holding each support assembly of the cylinders 52 in fixed relation with the flange member 50. In the arrangement shown, the flange member 50 has three openings arranged one hundred twenty degrees apart with respect to its axis, through which each support 51 may extend into abutting relation with the plate 56.

In FIGURE 8, the circumference 59 defines the opening in the member 50 through which extends the support 51 into abutting relation with the end plate 56. The member 50 further functions as a liquid-impervious wall extending between the cylinders 52 (or the supports 51 thereof) and the inner surface of the housing to assure that all liquid received into the intake region of any one section which houses a coalescing unit will be forced through a wall of coalescing material, such as that defined by the cylinder 52.

In the embodiment being described, member 50 is of such circumference as to extend between the flanges of two adjacent sections as shown in FIG. 11. Because of the manner in which this apparatus operates, the flange member is located at the effluent discharge-end of the housing section in which it is supported and extends between its flange at that end and the flange of the next adjacent section disposed toward the outlet of the apparatus. To facilitate positioning of the member 50 between the flanges of two adjacent sections, it may be provided with an annular locating ridge 61 protruding in an axial direction to fit loosely within the inner periphery of the housing section in which the coalescing unit is received.

The discs 54 constitute fluid impermeable end walls for the cylindrical supports 51 and the coalescing cylinders 52. They assure that fluid will enter the interior regions without passing in a radial direction through the cylinders 52. To maintain the coalescing unit 34 more rigid, and the axes of the supports 51 in parallel arrangement, respective bolts 58 extend through, and the nuts thereof are tightened against, a supporting ring 63. Further support of the unit may be had through the provision of lugs 64 on the end plate members 54 for engaging the inner surface of the housing section in which the coalescing unit 51 is supported.

The apparatus shown in FIG. 2 comprises, as an important feature, two similar screens 65 and 65a supported adjacent the effluent discharging end of coalescing units 34 and 34a, respectively. The screen 65, shown alone in FIG. 10, comprises an annular frame 66 which supports the fabric section 67 of the screen in a plane in axially offset relation with the flange portion 68. This arrangement enables the screen to be supported within the housing by securement of a marginal or flange portion of the frame 66 between the flanges at the adjacent ends of the housing sections along with the flange member of the coalescing unit supported in the next rearward housing section.

FIG. 11 illustrates a peripheral marginal portion of the flange member 50 and the frame flange portion 68 secured side by side between housing section flanges, e.g., flanges 43 and 44 with each flange separated from the adjacent flange by a gasket 71, 72, or 73.

Many other modes of securing a screen adjacent the effluent discharging end of a coalescer are available. However, it is desirable that the foraminous panel 67 of the screen be spaced beyond the exhaust end of the cylindrical supports 51 in order that the current of effluent issuing therefrom may have an opportunity to be equalized approximately over the entire area of the panel of screen 67. In the apparatus shown, spacing of the screen fabric from the exhaust face of the coalescing unit 34 or 34a is attained by forward offsetting thereof with respect to the flange portion 68 of the screen. Preferably, such offsetting should dispose the panel of screen fabric at least 3 inches from the exhaust ports contiguous with each coalescing wall or cylinder.

When the apparatus performs more than one stage of coalescing, i.e., it comprises more than one coalescing unit, a screen disposed between two coalescing units must not be located so close to the unit later or frontward along the path of effluent as to substantially interfere with uniform current through all portions of the screen. Hence, it is desirable that the coalescing unit of the succeeding stage be spaced as far from the discharge side of the screen as practicable in order that the screen may be disposed between the two coalescing units at sufficient spacing each to avoid substantial variation in the rate of passage of liquid through the various sections of the screen. That is, the space between the screen panel 67 and the coalescing unit 34a should be a matter of several inches. For example, if the interior diameter of the housing is four feet, then the spacing between the screen 65 and the unit 34a should be at least three inches and preferably up to six inches or more to permit the establishment of a satisfactory trajectory of globules discharged by the screen into the dome upper portion of the housing section 38.

The foraminous panel 67 of the screen 65 may consist of a fine wire fabric, preferably of a mesh around 60 although finer or coarser meshes within the range of 40 to 80 mesh may be used with diminishing results toward the end of the range. Screens of any metal used ordinarily for making screen are satisfactory, although stainless steel wire (because of its resistance to corrosion and its toughness) is a preferred material. Screens of textile and plastic materials have also been used with satisfactory results.

The coalescing cylinder 52, as illustrated in FIG. 5, may comprise essentially a batting of loose fibres sufficiently dispersed to provide interstices extending from the outer periphery of the cylinder to its inner periphery in a manner known to the coalescing art for achieving separation of suspended liquid from a carrier liquid. In the practice of this invention, outstanding results are achieved when the cylinder 52 comprises a cylindrical wall of glass fibre approximately 2 inches thick of which the inner inch of thickness of the wall is formed of a batting of fine denier glass fibre having a density of about 3 pounds per cubic foot, and the outer inch of a thickness comprises a stratum of coarser denier fibre having a density of 5 pounds per cubic foot. Furthermore, the cylinder 52 may comprise an inner stratum disposed next to the cylindrical support 51 and having a mesh comparable to the screens hereinabove described to avoid what is known to the art as "graping." The suspension, in passing through the material of the coalescing cylinder, produces globules of the carrier liquid encased in a thin spherical envelope of film comprising coalesced liquid of the suspended component in the manner in which the skins of grapes fit over the pulp centers thereof. These "grapes," because of their lack of different density with the carrier liquid, are very difficult to separate by floatation alone. They must be broken up by passing through a foraminous diaphragm of some sort of which the mesh is not too fine to re-emulsify globules of the coalesced suspended liquid. The screen 65 is also very effective in carrying out this function of the apparatus.

FIG. 6 illustrates another type of coalescing cylinder 70 which may comprise a cord of metal or textile strands wrapped to form the cylinder. Generally speaking, the cylinders 52 and 70 are formed by removing the supports 51 from the unit 34 and then forming the cylinder thereover. A material found effective in forming either cylinder is stainless steel fibre which may be applied as a batting in forming cylinder 52 or formed into a roving or cord to shape the cylinder 70.

The coalescer unit 75 may take the somewhat simpler design shown in FIG. 3 having a single coalescing cylinder in an assembly comprising a cylindrical support 76, a coalescing cylinder 77 adapted to fit tightly around the support 76 during operation, and an end plate or wall 78 secured to the support by bolts 79 when screwed into threaded relationship with threaded lugs 80 integral with the support 76. The support 76 is fixed by welding or other means to a flange member 81 which may be secured between housing sections in the same manner as described with respect to member 50 of the earlier described coalescing unit. The composition of the cylinder 77 may be similar to that described with respect to cylinders 52 and 70.

The above text describes immiscible liquid separating equipment of this invention with respect to basic or preferred structural relationships and preferred operating conditions which assure separation of the suspended oily component and the aqueous carrier component of stable emulsion or suspensions of high concentration to but a few parts per million of the suspension in the carrier. Apparatus according to this invention is highly flexible in its capacity to meet varying conditions. For example, the apparatus is designed so that intermediate sections may easily be inserted into the basic equipment to meet conditions of higher throughput or increased concentrations of the suspended liquid of the suspension by adding one or more additional sections. It is possible in this manner to compensate for liquid throughput volumes which exceed above recommended liquid velocities through the equipment. Stated in another manner, the purity of the effluent may be controlled by adjusting the throughput rate, or varying the number of coalescing sections included in the separator. However, the expense of adding additional intermediate sections, and coalescing unit to process greater than recommended throughputs may call for the use of larger or additional parallel equipment.

The terms and expressions which have been employed are used as terms of description and not of limitation and there is no intention of excluding such equivalents of the invention described or portions thereof as fall within the scope of the claims.

What is claimed is:
1. Apparatus for separating the suspended liquid from a suspension formed by two immiscible liquids comprising:
   (A) an outer housing having its length oriented in a generally horizontal direction and defining a path for liquid extending from an inlet at one end of the housing to an outlet at the other end thereof;
   (B) a wall supported within the housing transversely of said path comprising a material of three-dimensional lattice structure defining liquid-conducting interstices therethrough and of a thickness and fineness of mesh as to cause substantial impingement of particles forming the suspension, coalescence of, and escape in the form of larger coalesced globules, said wall having its opposite lateral surfaces parallel to the length of the housing;
   (C) partitioning means connecting with the extremities of said wall and the interior surface of the housing to define a first liquid-conducting region extending lengthwise of one of said opposite surfaces defining a portion of the path in which liquid is forced to flow along said path from said inlet into, and lengthwise along, said one surface of the wall and through the wall to said other surface;
   (D) said partitioning means, said wall, and the interior surface of the housing defining also a second region in which liquid passing from said other surface of the wall flows to said outlet; and
   (E) a screen disposed in said second region transversely of said path and arranged with respect to other components inside said housing to force passage of all effluent from said wall therethrough, said screen having a mesh in the range of 40 to 80; and
   (F) said housing, wall, and partitioning means being proportioned and arranged to establish predetermined liquid-conducting capacities of said wall and said second region establishing a flow rate in the approximate range of 0.75 to 1.1 inches per second through said screen when the flow rate through said wall is in the approximate range of 0.08 to 0.1 inch per second.

2. Apparatus for separating the suspended liquid from the carrier liquid of a suspension formed by two immiscible liquids comprising:
   (A) an outer housing having a path for liquid therethrough and comprising a plurality of sections of tubular conformation disposed in horizontally end-to-end arrangement which have mating end-flanges in opposed relationship, said sections including intake and exhaust end sections providing an inlet and an outlet, respectively, for liquid at the opposite ends of the housing and said path, any section intermediate said end sections having flanges mating with said end flanges adapted for end-to-end securement of adjacent sections by adjacent flanges;
   (B) a coalescing unit adapted for disposition in any of said units except said exhaust section having a length less than that of the section in which it is disposed, said unit comprising: (1) a foraminous cylindrical support having its longitudinal axis in substantially parallel relation with that of the housing, said member being open at the end thereof nearer the outlet, and having a liquid impervious end wall at the other end; (2) a flange member for supporting the support within its respective housing section fixed to and extending transversely to said axis from the outer periphery of the support adjacent its open end as a liquid impervious wall to the inner periphery of the housing and between the flange of the section in which it is housed and the flange of the next adjacent section disposed toward said outlet, said member having an opening therethrough conforming generally to said open end and contiguous with an interior region of the support, and (3) a coalescing cylinder in closely fitting relation with the outer surface of the support having interstices extending between, and contiguous with, a region surrounding said cylinder and said interior region for the passing of liquid from said surrounding region to said inner region, said material being of such fineness and thickness as to cause substantial impingement therewith of liquid particles forming said suspension, coalescence thereof, and escape into both regions in the form of larger globules of the suspended liquid;

(C) said intake section and any intermediate section being of a length adapting either section to receive said coalescing unit entirely within its length, enabling said intake and intermediate sections to simultaneously house coalescing units similar to said coalescing unit in similar orientation relative to its respective housing and in relatively spaced relation with each other, and said named components being proportioned and arranged to establish a rate of liquid flow through the exhaust section in the approximate range of 0.75 to 1.1 inches per second when the rate of flow through the coalescing cylinder is controlled to a rate within an approximate range of 0.08 to 0.1 inch per second; and screen means having a fineness of mesh in the range of 40 to 80 mesh and disposed adjacent said open end of the support transversely of said path and connected interiorly of the housing with other components of said apparatus to enforce passage therethrough of substantially all effluent from said interior region.

3. The apparatus of claim 2 wherein:
a coalescing unit similar to said coalescing unit is contained in said intake section and in any intermediate section of sad housing, and each section has a vertically extending chamber for entrapping the liquid derived from said suspension.

4. The apparatus of claim 2 wherein:
coalescing units similar to said coalescing unit are contained, one to a section, in said intake section and any intermediate section of said housing, and the apparatus comprises a screen disposed adjacent the effluent-discharging end of each unit transversely of said path, said screen is connected interiorly of the housing with other components of the apparatus to enforce passage therethrough of all effluent from the interior region of the unit having said opening; and each section has an upwardly projecting chamber for entrapping liquid derived from said suspension.

References Cited
UNITED STATES PATENTS

| | | | |
|---|---|---|---|
| 1,665,164 | 4/1928 | Gard et al. | 210—335 |
| 2,522,378 | 9/1950 | Kirkbride | 210—335 |
| 2,588,794 | 3/1952 | Barton | 210—2 |
| 2,601,904 | 7/1952 | Erwin | 210—23 X |
| 2,713,919 | 7/1955 | Walker et al. | 210—23 X |
| 2,758,720 | 8/1956 | Van Dijk | 210—23 X |
| 2,933,191 | 4/1960 | Rohr | 210—309 |
| 3,027,009 | 3/1962 | Price | 210—316 X |
| 3,048,275 | 8/1962 | Headrick | 210—247 |
| 3,055,505 | 9/1962 | Lawson | 210—335 |
| 3,182,800 | 5/1965 | Kasten et al. | 210—96 |
| 3,231,091 | 1/1966 | Kingsbury et al. | 210—335 |

REUBEN FRIEDMAN, *Primary Examiner.*

F. SPEAR, *Assistant Examiner.*